United States Patent [19]

Whipple et al.

[11] Patent Number: 4,719,622
[45] Date of Patent: Jan. 12, 1988

[54] SYSTEM BUS MEANS FOR INTER-PROCESSOR COMMUNICATION

[75] Inventors: David L. Whipple, Braintree; Tom R. Kibler, Groton, both of Mass.

[73] Assignee: Wang Laboratories, Inc., Lowell, Mass.

[21] Appl. No.: 712,492

[22] Filed: Mar. 15, 1985

[51] Int. Cl.[4] ............................................. H04L 5/20
[52] U.S. Cl. ...................................... 370/85; 364/200
[58] Field of Search ........................... 370/89, 88, 85; 340/825.5, 825.05; 364/200, 900

[56] References Cited

U.S. PATENT DOCUMENTS

| | | | |
|---|---|---|---|
| 4,030,075 | 6/1977 | Barlow | 364/200 |
| 4,342,995 | 8/1982 | Shima | 370/85 |
| 4,380,052 | 4/1983 | Shima | 370/85 |
| 4,408,300 | 10/1983 | Shima | 370/85 |
| 4,559,595 | 12/1985 | Boudreau et al. | 370/85 |

FOREIGN PATENT DOCUMENTS 0177629 12/1984 Japan ...................................... 370/85

OTHER PUBLICATIONS

*New Electronics*, "An Inexpensive Asynchronous Priority System", Nov. 24, 1981, vol. 14, No. 23, p. 23.
IBM Technical Disclosure Bulletin, "Decentralized Request Resolution Mechanisms", Jul. 1977, vol. 20, No. 2, pp. 853–855.

*Primary Examiner*—Douglas W. Olms
*Assistant Examiner*—Melvin Marcelo
*Attorney, Agent, or Firm*—Michael H. Shanahan; Gordon E. Nelson

[57] ABSTRACT

A system bus and bus interface apparatus for connecting components in a data processing system having a plurality of non-memory and memory components. The system bus has the following sets of lines; A first plurality of lines carries a plurality of codes specifying a plurality of memory operations involving communications between a non-memory component and a memory component and a single code specifying an interprocessor communication between two non-memory components. A second plurality of lines carries an address in a memory component when the code on the first plurality of lines specifies a memory operation and a target address, an interprocessor communication type, and in some cases, a message, when the code on the first plurality of lines specifies an interprocessor communication. A third plurality of lines carries signals indicating the status of a memory operation, a fourth plurality of lines carries signals indicating the status of an interprocessor communication, a fifth plurality of lines carries data in memory operations and in certain interprocessor communications, and a sixth plurality of lines determines which of the components presently has access to the bus. Memory communications may specify read and write operations, but interprocessor communications may specify only operations in which the source component provided data to the destination component.

24 Claims, 9 Drawing Figures

SYSTEM BUS MEANS FOR INTER-PROCESSOR COMMUNICATION

BACKGROUND OF THE INVENTION

1. Field of the Invention

The present invention relates to a bus structure for use in an information processing system and, more particularly, to a system bus for interprocessor communication among processing elements connected from the system bus.

2. Description of the Prior Art

A basic architectural feature of many information processing systems, that is, computer systems, is the use of a common system bus to interconnect a plurality of processing elements, such as CPUs, memories and input/output controllers, each of which is capable of the independent execution of data processing and handling operations. The system bus provides the means by which the processing elements communicate, that is, coordinate their operations and exchange information, such as data.

As such, the structure and operation of the system bus is central to the operation and performance of the system and several recurring problems are seen in the design of such system busses. For example, it may be necessary to expand or reconfigure the system bus to meet differing functional requirements of the system. Additionally, it is desirable to be able to reconfigure the system bus without requiring changes to the processing elements and that the recognition as simple to accomplish as possible in terms of the bus itself. Moreover, changes in the configuration of the system bus should not in themselves alter the operation of the system or the processing elements.

Another problem is the manner in which the processing elements determine priority of access to the system bus. In many systems, the relative priorities of access to the system bus of the processing elements is either hardwired or otherwise determined by the physical location of the processing elements in the system. The simple addition of a processing element, for example, another input/output controller, may require substantial physical rearrangements to the system. Physical bus access determination methods are undesirable also in multi-processor systems wherein many, if not all, of the processing elements essentially require equal access to the system bus.

In an alternate common method of determining system bus access, the processing elements are provided with a means for contending for priority of access to the bus. This approach reduces the possible speed of operation of the system bus due to the overhead required by the contention process, and may result in some processing elements being locked out of access to the bus for unacceptably long periods.

Yet a further concern is the manner in which interprocessor communications are actually performed. In many systems, all communications are treated in the same manner, so that frequent types of communications cannot be executed in an accelerated manner, thereby again limiting the speed of the system bus.

In addition, in many systems the types of communications between the processing elements are fixed. As a result, it is difficult to provide for new types of communications or to expand those originally provided, so that any addition or expansion of communications must be fitted into the existing communications types. This in turn limits the flexibility of the system in adapting to new or expanded functions and may result in a degradation of system performance.

The present invention provides a system bus structure and operation having improvements and features which address the above described problems and limitations.

SUMMARY OF THE INVENTION

The present invention relates to a system bus structure and operation for interprocessor communication in an information processing system incorporating a plurality of processing elements, each of which may be capable of independently executing certain information processing or handling operations.

The system bus structure presented herein comprises an access control bus for conducting a bus access signal indicating the occurrence of an interprocessor communication and a communications bus which includes a first bus for conducting signals indicating that the interprocessor communication is a specific one of a first class of communications or is a member of a second class of communications and second bus for communicating the information content of the communication.

The first class of communications includes memory related communications and the information content of a communication of the first class includes a source or destination memory address field and, if the field contains a destination address, a data field containing the information to be communicated. The second class of communications includes non-memory related communications and the information content of a communication of the second class includes a first field indicating the destination element, a second field indicating the type of communication, and a third field containing a message. The information content of a communication of the second class may further comprise a data field containing information to be communicated.

In the present implementation, the second bus comprises an address bus means for communicating the address fields of the first class of communications and the first, second the third fields of the second class of communications and a data bus for communicating the data fields of the first and second classes of communications.

The access control bus comprises a loop, with the processor elements connected in series along the access control bus means loop, and the processor elements are connected in parallel to the communications bus.

The bus access signal is conducted through the access control bus loop to each processor element in turn along the access control bus loop, so that the relative priorities of access of the processor elements to the communications bus rotate around the access control bus loop as the bus access signal is propagated around the access control bus loop.

The normal state of the bus access signal indicates that the communications bus is available for access by the processor elements. A processor element takes access to the communications bus by blocking propagation of the bus access signal, thereby forcing the bus access signal propogated to all other processor elements connected in the access control bus loop to a state indicating that the communications bus means is not available for access.

Other objects, advantages and features of the present invention will be understood by those of ordinary skill in the art after referring to the following detailed description of the preferred embodiment and drawings, wherein:

DESCRIPTION OF A PREFERRED EMBODIMENT

The following description will first present the overall structure of a system incorporating a presently preferred embodiment of the present invention, followed by a description of the bus structure of the present invention. The operation of the bus structure will then be described with the aid of flow charts, and the interface logic by which the elements of the system are interconnected to the system bus will be described.

It should be noted that reference numbers appearing in the drawings and in the following descriptions are comprised of three digits. The two least significant (rightmost) digits identify a particular element appearing in a particular drawing and the most significant (leftmost) digit identifies the figure in which that element first appears. For example, element 124 is the 24th element appearing in FIG. 1 and first appears in FIG. 1. A reference numbers is assigned the first time the reference element appears in the descriptions and is used to refer to that element throughout the following descriptions and drawings.

A. Elements of System 102 and General Operation (FIG. 1)

Figures 1, 1A, 1B:
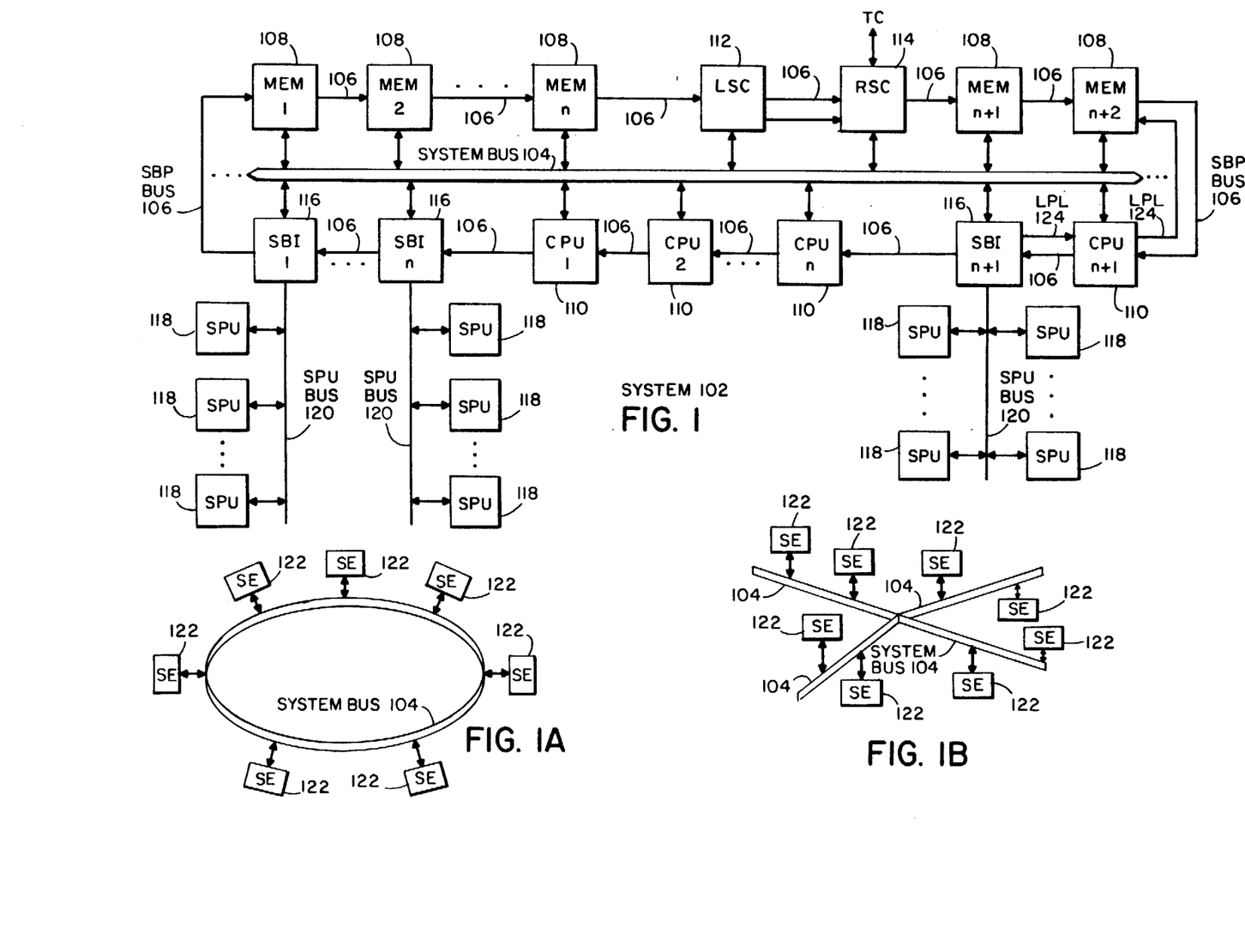
FIG. 1 is a block diagram of a system incorporating the present invention.
FIGS. 1A and 1B are alternate system bus topologies.

Referring to FIG. 1, therein is presented a block diagram of an exemplary System 102 incorporating the inter-processor bus structure of the present invention. As shown therein, the two primary elements of the system bus structure that are visible at this level are System Bus 104 and System Bus Priority (SBP) Bus 106. System Bus 104, the detailed structure of which is described further below, is the means by which the elements of System 102 communicate with one another. SBP Bus 106, also described in detail below, is the link through which the elements connected from System Bus 104 determine access to System Bus 104.

As shown in FIG. 1, the elements comprising System 102 fall into two classes, those which are connected directly to System Bus 104 and SBP Bus 106 and those which are connected indirectly to System Bus 104, that is, through another element which in turn is connected directly to System Bus 104 and SBP Bus 106. As described further below, elements directly connected to System Bus 104 and SBP Bus 106 are fundamentally regarded as a peers with regard to access to System Bus 104, that is, each such element has equal priority of access to System Bus 104 with respect to all other such elements. The access priorities of indirectly connected elements are determined by the access priorities of the associated elements through which they are connected to System Bus 104.

Considering first the elements connected directly to System Bus 104, each such element includes sufficient internal intelligence, for example, in the form of microcode control, to perform at least specialized functions independently of the other elements of System 102. Examples of such elements, as illustrated in FIG. 1, includes Memory Units (MEMs) (1 to n+2) 108, Central Processing Units (CPUs) (1 to n+1) 110, Local System Controllers (LSC) 112, Remote System Controllers (RSC) 114, and System Bus Interfaces (SBIs) (1 to n+1) 116.

The design of and functions performed by elements such as MEMs 108 and CPUs 110 are well known in the art and require no further description. LSC 112 and RSC 114 may, for example, be small computers of the personal or professional class adapted to perform certain system control functions, such as providing a user control interface, that is, a "soft control panel". In this respect, RSC 114 may differ from LSC 112 in being connected to a remote user/controller, for example, for diagnostic purposes, through a Telecommunication Link (TC).

SBIs 116 are the elements, described above, through which indirectly connected elements such as Satellite Processing Units (SPUs) 118 are provided with access to System Bus 104. As illustrated in FIG. 1, SPUs 118 are interconnected with each other and to an associated SBI 116 through an SPU Bus 120. The link between the associated SPU Bus 120, and thus the SPUs 118 connected therefrom, and System Bus 104 is in turn provided through the associated SBI 116. It should be noted that SPUs 118 and SPU Busses 120 may use the same structure and operation as described below with reference to System Bus 104 and SBP Bus 106, that is, may be arranged as local system buses identical to the main system bus. SPUs 118 and SPU Busses 120 may alternately be of any other suitable design for the system operation.

SPUs 118 essentially include all devices or system elements which, for example, due to data rates or functions, do not require direct access to System Bus 104 to perform their functions. Examples of SPUs 118 are input/output devices such as disc drives, displays, printers, telecommunications links, tape streamers and user terminals. SPUs 118 may further includes independent or associated processing units, such as other general purpose computers or specialized processing devices, such as scanners and specialized arithmetic or signal processors.

B. System Bus 104, General Structure and Operation (FIGS. 1, 1A and 1B)

Returning to System Bus 104, as described above System Bus 104 is the means through which the elements of System 102 communicate. In the present embodiment of System 102, and as shown in FIG. 1, System Bus 104 is a linear bus with each of the peer elements of System 102 connected therefrom, the connections to System Bus 104 being unidirectional or bidirectional as required by the function of the element. System Bus 104 may be extended as required by the particular configuration of a System 102, that is, to add or subtract system elements or to connect two or more System 102's into a single system.

It should be noted that, as described below, the logical configuration of System Bus 104 is defined by SBP Bus 106 and may assume any topological structure required by the function of System 102. For example, System Bus 104 may be physically arranged in the loop and star configurations illustrated respectively in FIGS. 1A and 1B. In the loop configuration, the ends of System Bus 104 are tied together to form a closed loop from which System Elements (SEs) 122 are connected. In the star configuration, System Bus 104 is comprised of a number of bus segments radiating from a common junction and SEs 122 are connected from the radiating segments as required by the system configuration.

C. System Bus Priority Bus 106 (FIG. 1) Referring again to FIG. 1, as described in detail further below SBP Bus 106 is the means through which the System 102 elements connected to System Bus 104 determine access to System Bus 104. As shown in FIG. 1, SBP Bus 106 forms a loop with all of the elements connected from System Bus 104 being serially connected in the SBP Bus 106 loop.

It is assumed, in the exemplary System 102 presented herein, that all processing elements connected from System Bus 104 may have the capability to independently initiate interprocessor communications; thus all elements connected from System Bus 104 are shown as connected in the SBP Bus 106 loop. In certain cases, for example, memory elements, the processing elements may be such that they do not initiate interprocessor communications but will only receive and respond to such communications. Such elements will require access to System Bus 104 to receive such communications and to respond to such communications, for example, by reading data from a memory element to a CPU element, but will not be required to claim access to System Bus 104, that is, access to System Bus 104 will be provided by the element sending the communication being responded to. In such cases, these "response only" elements need not be connected in the SBP Bus 106 loop but will be connected to System Bus 104.

As described below, priority of access to System Bus 104 is passed from one element of System 102 to the next element in the SBP Bus 106 loop in a "rotating daisy chain". That is, if a given element currently has access to System Bus 104, the next element along the SBP Bus 106 loop following the current element has the highest priority for next access to System Bus 104, followed by the next element along SBP Bus 106, and so on around the SBP Bus 106 loop until the current element is reached again. When the element currently having access releases System Bus 104, the opportunity to gain next access is passed through SBP Bus 106 to the next element along SBP Bus 106. That next element may take access to System Bus 104 or, if it does not do so, passes the opportunity for access to its next element along SBP Bus 106, and so on until the element originally having access is reached again or some element along SBP Bus 106 takes access to System Bus 104.

The order of priority of access to System Bus 104 thereby rotates around SBP Bus 106 with each element in turn having an opportunity to gain access to System Bus 104. Thus the average priorities of access to System Bus 104 of all elements connected thereto will be equal, with the relative priorities of the elements at particular points in time being determined by their positions along SBP Bus 106 relative to the element currently having either actual access to or the right to access System Bus 104.

Because of the rotating shifting of access priority to System Bus 104 among the elements of System 102 connected from SBP Bus 106, the elements connected to System Bus 104 do not contend for access to System Bus 104. As a result, the access determination logic, described further below, is simplified and, by eliminating System Bus 104 overhead which would otherwise be used in resolving access priorities, the speed of communication between the elements connected to System Bus 104 is increased. In addition, and because each element connected to System Bus 106 and SBP Bus 106 has an equal opportunity to gain access to System Bus 104, no element can be locked out of access to System Bus 104 for an extended period.

Moreover, and again because of the rotating shifting of access priority to System Bus 104 among the elements of System 102, the position of a System 102 element along either SBP Bus 106 or System Bus 104 has no bearing on the average priority of that element to access System Bus 104. That is, and as described above, all elements connected to System Bus 104 and in the SBP Bus 106 loop are peers having, on the average, equal access rights to System Bus 104. As such, an element may be added to System 102, or moved from one point along System Bus 104 and SBP Bus 106 to another, without affecting the average relative priorities of access to System Bus 104 of that element or any of the other elements connected to System Bus 104.

In this regard, SBP Bus 106 is represented in FIG. 1 as comprising a simple, clockwise loop with each element of System 102 being connected in series around the loop. It should be noted, however, that this representation is selected only for clarity of presentation. The elements of System 102 connected from System Bus 104 may, in fact, be connected in series along SBP Bus 106 in any desired order.

The order of elements along SBP Bus 106 may be effected, for example, by the above described temporary priorities of access having effect whenever a certain element has access to System Bus 104. That is, whenever a given element has access to System Bus 104, the next element along SBP Bus 106 has highest priority of next access, and so on around the SBP Bus 106 loop. If, for example, it were known that a particular operation involving access to System Bus 104 by a first element were frequently followed by a related operation again involving access to System Bus 104 by a second element, the second element may be connected in SBP Bus 106 next after the first element. Thus, whenever the first element executed its operation, it would be known that the second element would have the highest priority of next accessing System Bus 104.

To illustrate with reference to FIG. 1, assume that SBI1 116 is primarily engaged in input/output operations of information being operated upon by CPU1 110, for example, text processing. In such a case, and in order to enhance speed of response to user operations, it may be desirable to allow CPU1 110 next access to System Bus 104 each time SBI1 116 transfers information from a user, that is, a SPU 118, to one of MEM1-n 108. In this case, then, CPU1 110 could be connected in the SBP Bus 106 loop next after SBI1 116.

Finally, a second element of SBP Bus 106 is illustrated in FIG. 1 and referred to as Local Priority Link (LPL) 124. LPL 124 is essentially a means by which the relative priorities of elements interconnected through LPL 124 may be fixed, as opposed to the rotating priorities determined by SBP Bus 106. As will be described in detail in a following description of the SBP Bus 106 element residing in each element connected therefrom, LPL 124 allows the fact of a pending requirement for access to System Bus 104 by one element to be passed to another element connected along a LPL 124 to inhibit any pending accesses to System Bus 104 in the second element.

D. System 102 Bus Structure (FIG. 2)

Figure 2:
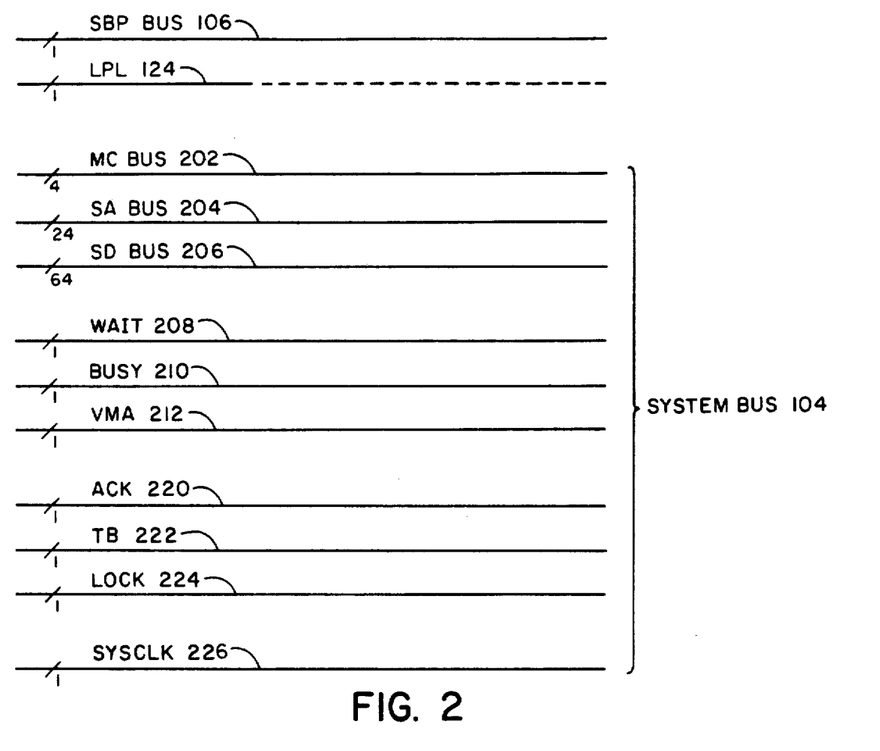
FIG. 2 is a diagram of the bus structure of the present invention.

Referring to FIG. 2, therein is presented a diagrammic representation of System 102's bus structure. As described above and shown in FIG. 1, this structure includes System Bus 104, SBP Bus 106 and, in certain cases, an associated LPL 124.

D.1 Memory Control Bus 202: Memory Operations and Interprocessor Communications As shown in FIG. 2, System Bus 104 includes a plurality of multiple and single line sub-busses. The first of these sub-busses is Memory Control (MC) Bus 202 which, upon the occurrence of a System 102 element obtaining access of System Bus 104, is used to communicate the type of System Bus 104 operation to be performed.

That is, when an element takes control of System Bus 104 that element signals this access by driving SBP Bus 106 to a state indicative of this fact and places on MC Bus 202 a code indicating the type of System Bus 104 operation to be performed. The elements of System 102 connected to System Bus 104 detect the occurrence of a System Bus 104 access by monitoring the state of SBP Bus 106 and, when an access is indicated, determine the type of System Bus 104 operation to be performed by reading the code placed on MC Bus 202 by the element having access to System Bus 104.

Most System Bus 104 operations are memory related, that is, are reads from or writes to MEMs 108. As such, and as will be seen below with reference to the MC Bus 202 codes, the entire class of non-memory related operations are indicated by a single code indicating that an "interprocessor" communication is to be executed, that is, a communication between two non-memory elements, such as an SBI 116 band a CPU 110. As described below, the elements connected to System Bus 104 must in such cases refer to other of the System Bus 104 sub-busses to determine and execute interprocessor communications.

The MC Bus 202 codes provided in the present implementation of System 102 include:

| CODE | TYPE OF OPERATION |
|---|---|
| 0 | No operation; |
| 3 | Read the contents of an MM 108 control register; |
| 4 | Read a quad word (16 bytes) of information from a specified MM 108 address location; |
| 5 | Read an octal word (32 bytes) of information from a specified MM 108 address location; |
| 6 | Read a double word (8 bytes) of information from a specified MM 108 address location; |
| 7 | Read a word (4 bytes) of information from a specified MM 108 address location; |
| 8 | Perform an inter-processor communication; |
| B | Write to an MM 108 control register; |
| C | Write a byte into a specified MM 108 address location; |
| D | Write a half word (2 bytes) into a specified MM 108 address location; |

-continued

| CODE | TYPE OF OPERATION |
|---|---|
| E | Write a double word into a specified MM 108 address location; and, |
| F | Write a word into a specified MM 108 address location. |

It should be noted that the above codes are presented in hexidecimal form and that codes 1, 2, 9 and A are reserved for future use.

Interprocessor communications are thereby executed as a default case from memory related operations. That is, a short "decision branch", reference to a code on MC Bus 202, is provided to identify and initiate memory related operations while a longer "decision branch", reference to further information on other sub-busses of System Bus 104 is required for non-memory related operations. This method thereby effectively increases the speed with which the majority of System Bus 104 operations, that is, memory related operations, may be initiated and executed by providing a shorter decision path for such operations while retaining flexibility in defining and executing all types of System Bus 104 operations.

D.2 System Address (SA) Bus 204 and System Data (SD) Bus 206

The next major sub-busses of System Bus 104 are System Address (SA) Bus 204 and System Data (SD) Bus 206. Considering first memory related operations, SA Bus 204 is the means by which read and write addresses are communicated between elements requesting memory operations and the MEMs 108 executing the operations while SD Bus 206 is the means by which information is communicated between the MEMs 108 and the other elements of System 102.

D.2.a Memory Operations

In a memory operation, as described above the System 102 requesting a memory operation first gains access to System Bus 104 through the operation of SBP Bus 106, described in further detail below, and places an appropriate MC Bus 202 code on MC Bus 202 to indicate the type of operation to be performed. The requesting element then places the read or write address onto SA Bus 204 and, if the operation is a write, places the data to be written onto SD Bus 206. The addressed MEM 108 then writes the data into the corresponding storage location therein. If the operation is a read, the addressed MEM 108 reads the information from the addressed storage location and places the information on SD Bus 206, from which the information is read by the requesting element. In the present implementation of System 102, for example, SA Bus is 24 bits wide, expandable to 31 bits, while SD Bus 206 is 64 bits, or a double word, wide.

Associated with SA Bus 204 and SD Bus 206 are three further single line sub-busses whose primary functions relate to memory operations. The first of these is WAIT 208. This signal is asserted by an addressed MEM 108 during a memory read operation if the requested information is not available and is monitored by the requesting element, which may accordingly go into a wait mode until the information becomes available.

The second memory operation control is BUSY 210, which is asserted by an addressed MEM 108 during a memory operation and before a System Bus 104 transmission is initiated. BUSY 210 indicates that System Bus 104 is not available and is monitored by the elements of System 102.

The third memory operation control is Valid Memory Access (VMA) 212, which is asserted by an addressed MEM 108 to indicate that a requested memory operation is valid, that is, that the address or data are valid. VMA is monitored by the element requesting the memory operation to determine whether the request was successful, that is, valid.

Figure 2A:
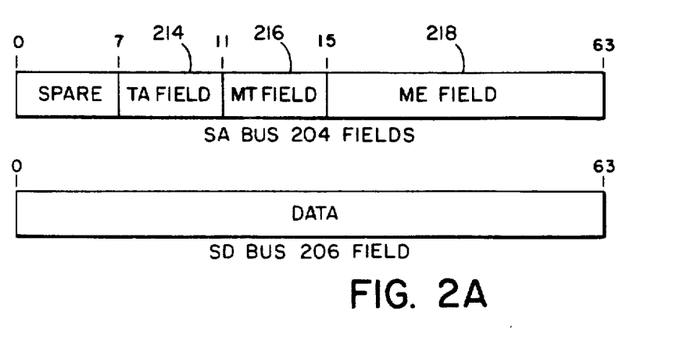
FIG. 2A is a diagrammic representation of interprocessor communications transmitted through the bus structure of the present invention.

D.2.b Interprocessor Communications (FIG. 2A)

Now considering non-memory related operations, that is, interprocessor communications, SA Bus 206 and SD Bus 206 operate differently in certain respects from that described above when an interprocessor operation is to be performed. As described above interprocessor operations are treated as a default from memory related operations, that is, a single MC Bus 202 code indicates the entire class of non-memory type operations. As also described above, upon the appearance of the interprocessor communication code on MC Bus 202 the elements connected to System Bus 104 must refer to information presented on SA Bus 204 and SD Bus 206 by the requesting element to determine the type of interprocessor operation to be executed.

Referring to FIG. 2A, therein is represented the information which may be presented upon SA Bus 204 and SD Bus 206 in an interprocessor operation. As shown therein, the information appearing on SA Bus 204 includes a 4 bit Target Address (TA) Field 214 identifying the target, or intended recipient of the message, a 4 bit Message Type (MT) Field 216 identifying the type of message to be sent to the target, and a 16 bit Message (ME) Field 218 which may contain a message. In certain interprocessor communication operations, wherein data is to be transmitted from one element to another, SD Bus 206 may contains a data field of up to 8 bytes.

D.2.b.1 AT Field 214 Codes

Considering now the various interprocessor communication fields appearing on SA Bus 204, the TA Field 214 may, for example, contain the following target identification codes:

| CODE | TARGET IDENTIFIED |
|------|-------------------|
| 0 | Support Control Unit (E.g., LSC 112 or RSC 114); |
| 1 | Broadcast to all CPUs 110; |
| 2 | CPU1 110; |
| 3 | CPU2 110; |
| 4 | CPU3 110; |
| 5 | CPU4 110; |
| 6 | CPU5 110; |
| 7 | CPU6 110; |
| 8 | CPU7 110; |
| 9 | CPU8 110; |
| A | Reserved for future use; |
| B | SBI1 116; |
| C | SBI2 116; |
| D | SBI3 116; |
| E | SBI4 116; and, |
| F | Broadcast to all SBIs 116. |

It should be noted that the above codes are presented in hexidecimal format.

It is apparent from the above code formats that the exemplary system envisioned in the above code assignments includes a single Support Control Unit 112 or 114, up to 8 CPUs 110 and up to 4 SBIs 116. The assignment of target codes may be altered at will, depending upon the envisioned configuration of the particular System 102. It should be noted that SPUs 118 are targeted and messages transmitted thereto through the SPU 118's associated SBIs 116. It should also be noted that the interprocessor communications allow the simultaneous broadcast of messages to all elements of a given type, for example, to all CPUs 110 or to all SBIs 116.

There are no target identification codes for memory elements, that is, for MEMs 108, provided in the exemplary TA Field 214 codes. As described previously, all memory related operations are initiated at the MC Bus 202 code level and the target MEMs 108 identified by addresses concurrently appearing on SA Bus 204.

D.2.b.2 MT Field 216 Codes

The contents of the MT Fields 216 depend upon the particular type of recipient identified in the associated TA Field 214, that is, in the present example, whether the targeted recipient is an SBI 116, that is, an SPU 118 connected from an SBI 116, a CPU 110 or a Support Control Unit 112 or 114. As will appear in the exemplary MT Field 216 codes presented below, an MT Field 216 code may identify a message as being the transfer of a message, the transfer of data, or a command for an operation or change of operating state on the part of the recipient element.

Considering first examples of the types of MT codes which may be transmitted to an SBI 116 type of element:

| CODE | MESSAGE TYPE |
|------|--------------|
| 0 | Message transfer to target SPU 118; |
| 1 | Data transfer to target SPU 118; |
| 8 | Reset target SBI 116; |
| 9 | Reset target SPU 118; |
| A | Turn Input/Output (I/O)) protection off; |
| B | Turn I/O protection on; |
| C | Enable I/O access to specified memory page; and, |
| D | Disable I/O access to specified memory page. |

Again, the MT Field 216 codes above are presented in hexidecimal format and codes 2, 3, 4, 5, 6, 7, E and F are reserved for future use.

Considering now examples of the MT Field 216 codes which may be used when the targeted recipient is a CPU 110:

| CODE | MESSAGE TYPE |
|------|--------------|
| 0 | Class 1 I/O Interrupt; |
| 1 | Class 2 I/O Interrupt; |
| 8 | Interprocessor communication; and, |
| 9 | Synchronize clock. |

Again, the codes are presented in hexidecimal format and codes 2 to 7 and A to F have been reserved for future use.

It should be noted that the above CPU 110 message types provide for two classes of I/O interrupt, Class 1 for when no error has appeared in the I/O operation and Class 2 for when an error has occurred in the I/O operation, for example, in the data. The two classes are provided because of the different handling of these events by the targeted CPU 110.

In the Interprocessor communication type of message, MT Code 8, only SA Bus 204 is used for the communication and the recipient CPU 110 refers to the accompanying ME Field 218 appearing on SA Bus 204 to determine the message, examples of which are presented below. The occurrence of such a communication causes an interrupt pending flag to be set in an interprocessor communication register internal to the recipient CPU 110, described below. The recipient CPU 110 micromachine will then read the interrupt pending flag, execute a macrointerrupt at the next opportunity, and execute a routine to appropriately handle the received message. If the interprocessor communication interrupt flag in the recipient CPU 110 is already active, the recipient CPU 110 will send to the transmitting CPU 110 acknowledgement and busy signals, as described below. It should be noted that in communications from SBIs 116 to CPU s 110, the SBI 116 receiving a busy response will handle the busy response in a manner appropriate to the SBI 116's bus protocol, that is, its protocol with respect to its SPUs 118.

Again, the particular message type codes appearing in MT Field 216 and their meanings may be determined at will, depending upon the configuration and function of the System 102 envisioned and the elements appearing therein.

D.2.b.3 ME Field 218 Messages

The 2 byte interprocessor communication messages appearing in ME Field 218 are, again, dependent upon the function and configuration of System 102 and the elements comprising System 102. Examples of such messages include, in the present implementation, communications between the system elements and the System 102's operating system being executed in the CPUs 110. Such operating system communications may include communications between an I/O device, that is, an SBI 116 or SPU 118, and the operating system and communications between the operating system and a Support Control Unit 112 or 114. For example, the operating system may send a message to a Support Control Unit to read or update an error file or requesting the Support Control Unit to examine some aspect of System 102's operation and report the findings of the examination to the operating system, for example, in diagnostic operations.

Other examples include communications between the CPUs 110 of a multiple-processor configuration of System 102. For example, a particular CPU 110 may wish exclusive access to a given page of memory and may inquire of the other CPUs 110 whether they are using that memory page. The requesting CPU 110 may then, if that page is not being used by another CPU 110, inform all CPUs 110, by a broadcast communication, that it is claiming exclusive access to that memory page. In a further example, a CPU 110 may wish to open and modify a particular file and will inform all other CPUs 110 that it is obtaining exclusive access to that file for that purpose. Yet other examples are messages coordinating the activities of the CPUs 110; for example, a first CPU 110 may assign a task to a second CPU 110 by an interprocessor message and the second CPU 110 may send a communication informing the first CPU 110 when the task is completed.

Still other examples of interprocessor messages occupying the ME Field 218 are I/O messages, essentially commands from the CPUs 110 to the SBIs 116 or SPUs 118 to initiate or control the operations of these elements.

Finally, and referring again to FIG. 2, as described above with reference to memory related operations certain single line sub-busses of System Bus 104 are associated with interprocessor communication operations. Among these are Acknowledge (ACK) 220 and Target Busy (TB) 222. ACK 220 is asserted by the target element of an interprocessor communication when that target exists and acknowledges that the sending element is attempting to send an interprocessor communication to that target element. The sending element monitors ACK 220 to determine whether the attempt to send an interprocessor communication was successful.

TB 222 is asserted by the target element of an interprocessor communication to indicate that the target element is busy and cannot accept the interprocessor communication. The sending element monitors TB 222 and, if the TB 222 is asserted by the target element, will handle the condition depending upon the nature and function of the sending element.

Also associated with both interprocessor communications and memory related operations is LOCK 224. LOCK 224 may be asserted by the initiator of a memory related operation or interprocessor communication to lock out all other users of System Bus 104. LOCK 224 may be asserted, for example, when an element wishes to communicate a series of interprocessor communications or a series of memory operations. LOCK 224 is monitored by all elements connected to System Bus 104 and no user will attempt to obtain access to System Bus 104 while another element is asserting LOCK 224.

Finally, as indicated in FIG. 2, System Bus 104 may include a System Clock (SYSCLK) 226, which is provided to all users of System Bus 104, thereby achieving common timing for all such elements.

Having described the operation of the bus structure of System 102, the bus interface logic residing in each of the elements connected to System Bus 104, and their operation, will be described next below.

E. System Bus Interfaces (FIGS. 3A and 3B)

Figure 3A:
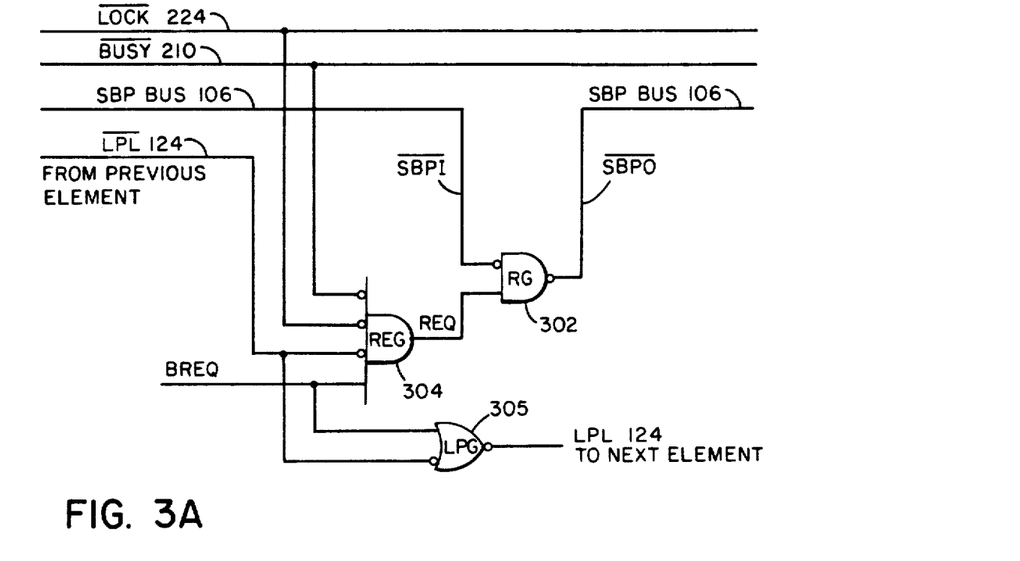
FIGS. 3A and 3B are schematic representations of the system bus interfaces incorporated into the elements of the present system; and, FIG. 4A and 4B are flow charts illustrating the operation of the present invention.
Figure 3B:
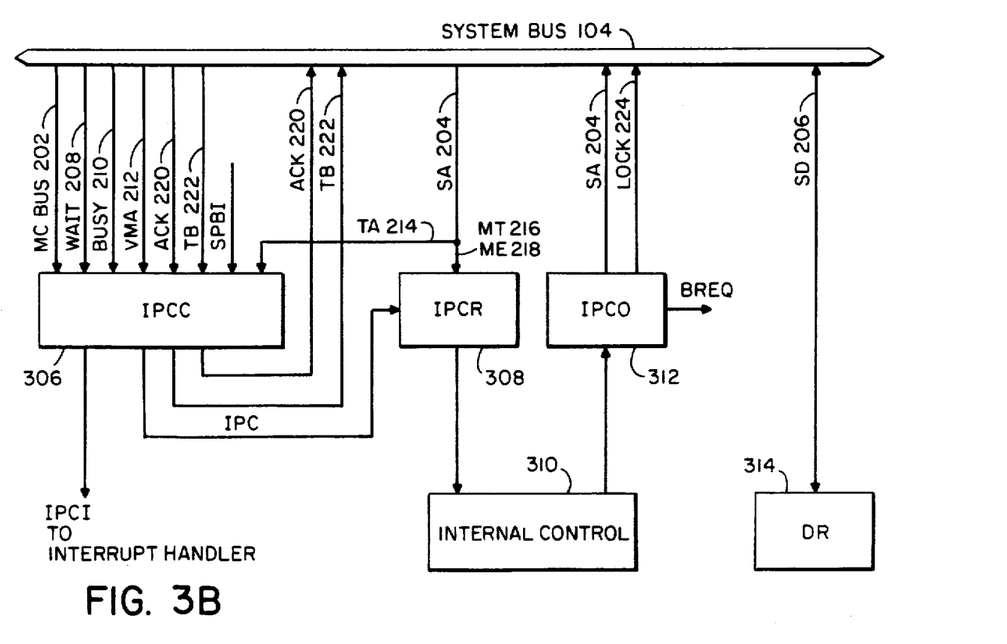

Referring to FIGS. 3A and 3B, therein are presented diagrammic representations of the interface circuitry provided in each element connected to System Bus 104 to interface these elements to System Bus 104. It should be noted that the logic and circuitry presented herein are illustrative and representative only and may be replaced by any logic or circuitry performing equivalent functions. In addition, where the design and operation of the logic and circuitry presented herein will be well understood by one of ordinary skill in the art, that logic or circuitry will not be described in detail. The operation of the element interfaces will, however, be described in detail where relevant to the present invention.

E.1 SBP Bus 106 Interface (FIG. 3A)

Referring first to FIG. 3A, therein is presented the interface circuitry primarily concerned with requesting and gaining access to System Bus 104. As previously described, each element connected to System Bus 104 is connected in series along the SBP Bus 106 loop. Other sub-busses of System Bus 104 concerned in obtaining access to System Bus 104 are, as indicated in FIG. 3A, Busy 210 and LOCK 224 and, in certain cases, LPL 124.

As previously described, when an element currently having access to System Bus 104 releases System Bus 104, the opportunity to gain next access is passed through SBP Bus 106 to the next element along SBP Bus 106. That next element may take access to System Bus 104 or, if it does not do so, passes the opportunity for access to its next element along SBP Bus 106, and so on until the element originally having access is reached again or some element along SBP Bus 106 takes access to System Bus 104.

As shown in FIG. 3A, the input of SBP Bus 106 from the previous element along the SBP Bus 106 loop is designated as SBP Input (SBPI) and is connected to a first input of Request Gate (RG) 302. It should be noted that SBPI is shown as an active low signal, as are all other overlined signals. The output of RG 302 is connected to the continuation of the SBP Bus 106 loop to the next element along the SBP Bus 106 loop and is designated as SBP Output (SBPO).

A second input of RG 302 is connected from the Request (REQ) output of Request Enable Gate (REG) 304. REQ will be generated, as described below, when the associated element wishes to request access to System Bus 104 and other conditions, determined by the various inputs to REG 304, also described below, do not prevent the element from requesting access. REQ operates as an enabling signal with respect to RG 302 and SBPI, that is, SBPI will be passed through RG 320 as SBPO and thus the SBPI of the next element along the SBP Bus 106 loop if REQ is not asserted. If, of course, REQ is asserted, SBPI is prevented from passing through RG 302 to become SBPO and the next element along the SBP BUs 106 loop will not receive an SBPI, the present element having claimed access to System Bus 104. RG 302 thereby operates as a gate to prevent the propagation of the opportunity to obtain access to System Bus 104, that is, the element may "capture" the opportunity, and as a signal level restorer for the SBPI/SBPO signal propogated along the SBP Bus 106 loop.

It should be noted, that due to the structure of the SBP Bus 106 interface logic, the SBP Bus 106 access signal will propagate around the SBP Bus 106 loop at a speed determined by the propagation time around the physical loop and the delays through the RGs 302 of the elements connected therefrom. As such, delays in gaining System Bus 104 access due to the operation of SBP Bus 106 and the element interfaces thereto are minimized and the overall speed of operation of System 102's bus structure enhanced.

Referring now to REG 304, as shown in FIG. 3A REG 304 receives a Bus Request (BREQ) signal from the element's internal control circuitry, described further below, when the element wishes access to System Bus 104. BREQ is gated, in REG 304 by inputs BUSY and LOCK, previously described, from respectively BUSY 210 and LOCK 224. In certain cases, also previously described, REG 304 is provided with a Local Priority signal from a previous element through an LPL 124. The enabling of REQ, and thus the capture of SBPI/SBPO thereby requires that BUSY, LOCK and a Local Priority signal, if any, not be asserted.

E.2 System Bus 104 Interface (FIG. 3B)

Referring to FIG. 3B, therein is presented a diagrammic representation of the general interface to System Bus 104 of an element connected to System Bus 104. As shown therein, the interface logic includes an Interprocessor Communication Control (IPCC) 306 having inputs connected from the sub-busses of System Bus 104 as indicated. Included among these inputs are the 4 bits of MC Bus 202, WAIT, BUSY, VMA, ACK AND TB, the functions of which have been described above. Also included in IPCC 306's inputs are the TA Field 214 from SA Bus 204.

These inputs essentially define the occurrence, type and state of execution of interprocessor communications and IPCC 306 is essentially comprised of decoding logic for decoding these inputs and providing corresponding outputs to the internal control circuitry of the element, for example, microcode control circuitry. The design of such internal control circuitry and of such decoding logic as IPCC 306 is well understood by those of ordinary skill in the art, especially after the previous and following descriptions of the operation of System 102's bus structure.

Among the outputs provided by IPCC 306 are an Interprocessor Interrupt (IPCI) to the elements interrupt handler, as previously described, and ACK and TB signals to ACK Bus 220 and TB Bus 222.

IPCC 306 also provides an output indicating the occurrence of an interprocessor communication (IPC) to Interprocessor Communication Register (IPCR) 308 which, as shown in FIG. 3B, is a register connected from the MT Field 216 and ME Field 218 portions of SA Bus 204. IPCR 308 thereby captures and stores the MT and ME fields of an interprocessor communication appearing on SA Bus 204, and provides these fields as inputs to the elements Internal Control Logic (Internal Control) 310.

As is well known in the art, Internal Control 310 may be comprised, for example, of dedicated control logic or a microcode programmed microprocessor controller. Internal Control 310 operates in a first respect to control the operation of the element in response to a received interprocessor communication and, in a second respect, to initiate and control interprocessor communications from the present element.

In this second respect, Internal Controller 310 may generate interprocessor communication control signals to Interprocessor Communication Output Controller (IPCO) 312. IPCO 312 may in turn be comprised of registers and decoding logic to generate MT and ME fields to the SA Bus 204 when the element is initiating an interprocessor communication, and may generate the BREQ signal, described above, when the element wishes to request access to System Bus 104 for an interprocessor communication.

Finally, the interface circuitry may include Data Registers and Drivers (DR) 314 connected with SD Bus 206 to communicate data between the element and SD BUs 206. Such data communication may occur, as previously described, in a memory related operation or when data is transferred in an interprocessor communication.

The interface between an element and System Bus 104 may differ from that described above when that element is a memory element such as an MEM 108. In such a case, the circuitry illustrated in FIG. 3A may be modified accordingly, that is, may contain only those functions necessary for memory related operations.

For example, an MEM 108 IPCC 306 may be provided only with inputs from MC Bus 202, which are sufficient and complete to define all memory related operations. The MEM 108's IPCC 306 may, accordingly, provide outputs WAIT, BUSY and VMA to the appropriate System Bus 104 sub-busses, rather than those shown in FIG. 3A. Similarly, the IPCR 308 of an MEM 108 will be comprised of an address input register connected from SA Bus 204 for receiving memory read and write addresses, and the MM 108 will include a bidirectional data connection to SD Bus 206.

Having described the bus and interface structures of System 102's bus structure, and the functions and operation of the signals involved therein, the operation of System 102's bus structure will be described further below with reference to flow charts illustrating these operations.

F. Flow Chart Illustration of Operation (FIGS. 4A and 4B)

Figure 4A:
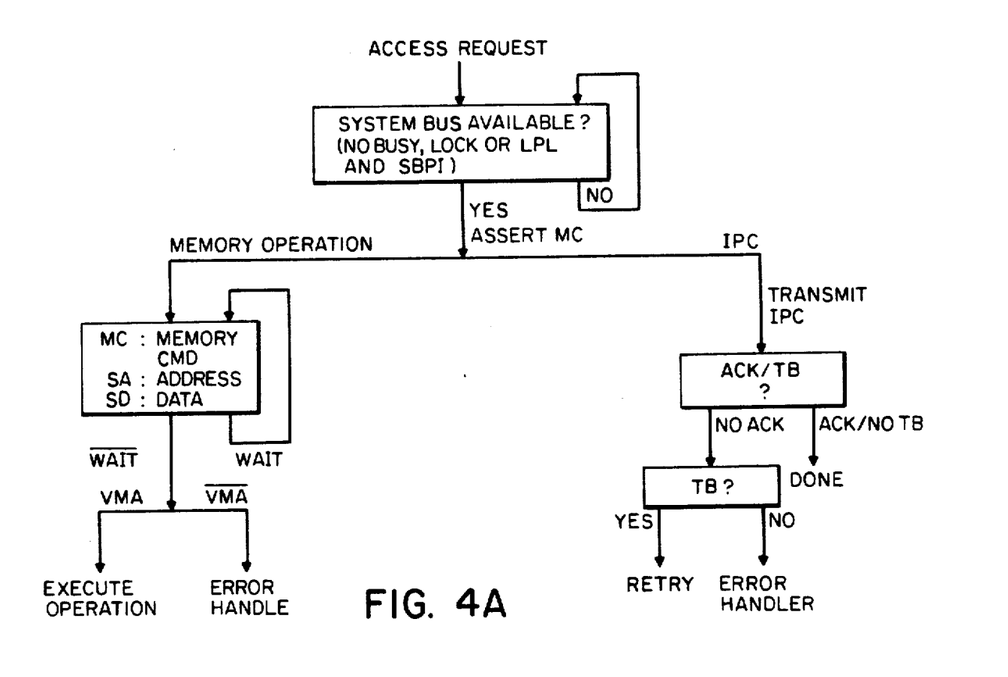
Figure 4B:
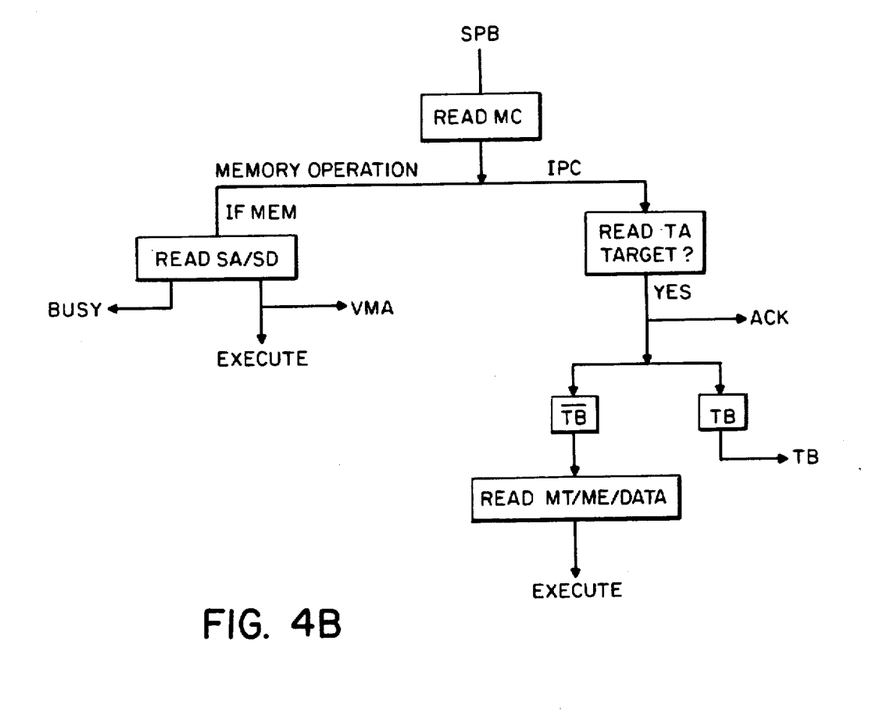

Referring to FIGS. 4A and 4B, therein are presented flow chart illustrations of the operations of System 102's bus structure. FIG. 4A is an illustration of a system bus operation from the viewpoint of the bus requestor, while FIG. 4B is an illustration from the viewpoint of the target element.

F.1 Bus Requestor Operation (FIG. 4A)

Referring to FIG. 4A, an interprocessor bus operation, either a memory operation or an interprocessor communication, is begun with the requesting element generating, through its internal control logic, an Access Request. In the first step, the requestor determines whether System Bus 104 is available; that is, and as previously described, the requestor determines whether BUSY, LOCK and LPL 124, if any, are asserted and whether SBPI indicates that System Bus 104 is available.

In the second step, and if the conditions for bus availability are met, the requestor seizes System Bus 104 by capturing the SBP Bus 106 signal and places an appropriate code on MC Bus 202 to indicate the type of operation to be performed. If System Bus 104 is not available, the requestor takes what action is necessary to wait until the bus is available and retries access.

If access to System Bus 104 was gained, and the operation is a memory related operation, the requestor places the memory operation address on SA Bus 204 and the information to be written, if any, on SD Bus 206 and monitors WAIT Bus 208.

If the responding memory element is busy, the memory will assert WAIT on WAIT Bus 208 and the requesting element must enter a wait mode until the responding memory element is available.

If the responding memory element is available, and the memory request is valid, the memory element will assert VMA on VMA Bus 212 and the operation will be completed. If the memory request was not valid, VMA will not be asserted and the requestor must refer to its error handler facility to resolve the problem.

If the requested operation was an interprocessor communication, the requesting element will place the appropriate fields, as previously described, on SA Bus 204 and SD Bus 206 and will monitor ACK Bus 220 and TB Bus 222.

If the target element asserts ACK and does not assert TB, the operation will be completed.

If the target element asserts ACK and TB, the requestor must wait and retry the communication as the target element is busy.

If the target element does not assert and does assert TB then the target element is again identified as busy and the requestor must retry the communication. If the target element does not assert ACK or TB, the requestor must refer to an error handler to resolve the problem.

F.2 Target Element Operation (FIG. 4B)

Referring now to FIG. 4B, therein is presented a general flow chart of the operation of a target element for both memory related operations and interprocessor communication operations.

At the first step, the target element monitors SBP Bus 106 and identifies the initiation of a System Bus 104 operation by the state of SBP Bus 106. At this time, the element reads the code on MC Bus 202 to determine the type of System Bus 104 operation to be executed.

Considering first a memory operation, and assuming that the target element is a memory element, the element then reads SA Bus 204 to determine the target address in System 102's address space and SD Bus 206 to capture the data to be written if the operation is a memory write.

If the target element is busy, it will respond by asserting BUSY on BUSY Bus 210. If the target element is not busy and the memory request is valid, the target element will assert VMA on VMA Bus 212 and will perform the requested operation.

Considering finally an interprocessor communication, the target element determines, by reading the MC Bus 202 code, that an interprocessor communication is to be performed and then reads the TA Field 214 from SA Bus 204 to determine whether that element is the target element.

If that element is the target element, it asserts ACK and, if not busy, does not assert BUSY.

Assuming that the element is not busy and is the target element, the element reads the MT Field 216 from SA Bus 204 to determine the type of communication and the ME Field 218 from SA Bus 204 to capture the message. The element then responds to these fields by executing what operations are required by the message, including reading data from the SD Bus 206 if the communication requires the transfer of data.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A system bus for coupling components of a data processing system which includes a memory component and other components and carrying a communication between at least two of the components,
   the system bus comprising:
   a first plurality of lines for carrying first codes including
      a plurality of memory operation codes specifying a plurality of types of memory communications having an other component as a source and the memory component as the recipient and
      a single inter-processor communication code specifying a non-memory communication having one of the other components as a source and another thereof as a recipient;
   a second plurality of lines which,
      when the first plurality of lines specifies one of the memory communication types, carries an address in the memory component and, when the first plurality of lines specifies a non-memory communication, carries one of a plurality of type codes specifying a plurality of types of non-memory communications and one of a plurality of recipient address codes specifying an other component as recipient;

a third plurality of lines for carrying signals specifying the status of a current memory communication; and a fourth plurality of lines for carrying signals specifying the status of a current non-memory communication.

2. A system bus as set forth in claim 1 wherein:
the system bus includes a fifth plurality of lines for carrying data;
the plurality of types of memory communications includes
write communications wherein the source component provides data on the fifth plurality of lines to the memory component to be written at the address specified by the second plurality of lines and
read communications wherein the source component receives data stored at the address specified by the second plurality of lines from the memory component on the fifth plurality of lines; and
the plurality of types of non-memory communications includes types of communications wherein the source component provides data to the recipient component on the fifth plurality of lines, but does not include communications wherein the recipient component provides data to the source component.

3. A system bus as set forth in claim 2 wherein:
the memory component stores data in memory words divisible into half words and bytes;
the types of write communications include
a write byte communication for writing a byte,
a write half word communication for writing a half word,
a write word communication for writing a word, and
a write double word communication for writing two words;
the types of read communications include
a read word communication for reading a word,
a read double word communication for reading two words,
a read quad word communication for reading four words, and
a read octal word communication for reading eight words; and
the address on the second plurality of line specifies the portion of a word, the word, or the sequence of words being read or written.

4. A system bus as set forth in claim 2 wherein:
the other components include
a central processing unit for processing data,
a system bus interface unit, and
a plurality of satellite processing units coupled to the
system bus interface unit; and
the types of non-memory communications include
types wherein the recipient component is the central processing unit,
types wherein the recipient component is the system bus interface unit, and
types wherein the recipient component is one of the satellite processing units.

5. A sytem bus as set forth in claim 4 wherein:
the types wherein the recipient component is the central processing unit include
a first I/O interrupt communication indicating that an I/O operation finished without error; and
a second I/O interrupt communication indicating that an error occurred during an I/O operation.

6. A system bus as set forth in claim 4 wherein:
the types wherein the recipient component is one of the satelite processing units include
a message transfer communication;
a data transfer communication; and
a reset recipient satellite processing unit communication.

7. A system bus as set forth in claim 1 and wherein:
the third plurality of lines includes
a wait line for carrying a wait signal indicating that the source component is to wait for completion of the memory operation specified in the communication;
a busy line for carrying a busy signal indicating that the memory component is busy; and
a valid memory access line for carrying a valid memory access signal indicating that the memory operation resulted in a valid memory access.

8. A system bus as set forth in claim 1 and wherein:
the fourth plurality of line includes
an acknowledgement line for carrying an acknowledgement signal indicating that the recipient component received the communication and
a target busy line for carrying a target busy signal indicating that the recipient component is busy.

9. A system bus as set forth in claim 1 wherein:
the codes specifying the non-memory communication further include a fifth code specifying a message in certain of the communications.

10. A system bus as set forth in claim 1 wherein:
the system bus includes a fifth plurality of lines for carrying data; and
certain of the non-memory communications include data transferred from the source to the recipient on the fifth plurality of lines.

11. A system bus as set forth in claim 1 and further including:
a system bus priority line for carrying an access signal indicating which component of those which presently can be sources of communications may have access to the system bus; and
a lock line for carrying a lock signal indicating that one source component is retaining access to the system bus.

12. System bus interface apparatus for coupling a component other than a memory component of a data processing system which includes both memory and other components to a system bus which has
a first plurality of lines for carrying first codes including a plurality of memory operation codes specifying a plurality of types of memory communications having an other component as a source and the memory component as the recipient and a single inter-processor communication code specifying a non-memory communication having one of the other components as a source and another thereof as a recipient,
a second plurality of lines which, when the first plurality of lines specifies a memory communication, carry an address in the memory component and, when the first plurality of lines specifies a non-memory communication, carry one of a plurality of type codes specifying a plurality of types of non-memory communications and one of a plurality of recipient address codes specifying an other component as recipient, and a third plurality of lines for carrying signals specifying the status of any non-memory communication, the system bus interface apparatus comprising:

control means coupled to the first plurality of lines, the second plurality of lines, and the third plurality of lines corresponding to the interprocessor communication code on the first plurality of lines and to a recipient component address on the second plurality of lines specifying the component containing the system bus interface by producing a first signal indicating the receipt of the communication and second signals on the third lines specifying the status of the communication;

means coupled to the second plurality of lines and responsive to the first signal for retaining the type code in response to the first signal; and processing means coupled to the type code retention means for receiving and interpreting the retained type code.

13. The system bus interface apparatus as set forth in claim 12 wherein:

the second plurality of lines further carries a message code specifying a message in certain of the non-memory communications;

the type code retaining means further retains the message code; and the type code interpreting means interprets the message code as well as the type code in the certain non-memory communications.

14. The system bus interface apparatus as set forth in claim 12 wherein:

the third lines include an acknowledgement line for carrying an acknowledgement signal indicating that the component to which the bus interface apparatus belongs has received the communication and a recipient busy line for carrying a recipient busy signal indicating that the component is presently busy; and the control means further responds to the interprocessor communication code on the first plurality of lines and to a recipient component address on the second plurality of lines specifying the component to which the system bus interface apparatus belongs by producing the busy signal on the busy line when the component to which the system bus interface apparatus belongs is busy.

15. The system bus interface apparatus as set forth in claim 14 wherein:

the control means further provides the inter-processor communication code to the first plurality of lines when the non-memory component is a source of an inter-processor communication;

the system bus interface apparatus further includes communication providing means coupled to the second plurality of lines and to the processing means for receiving a type code of the plurality of type codes and a recipient address code of the plurality of recipient address codes from the processing means and providing the type code and the recipient address code to the second plurality of lines when the non-memory component is a source of an inter-processor communication; and the control means further includes means coupled to the third plurality of lines for receiving and responding to the acknowledgement and busy signals produced by the control means in the recipient non-memory component specified by the recipient address code in response to the type code and recipient address code from the source.

16. The system bus interface apparatus as set forth in claim 15 wherein:

the system bus further includes a system bus priority line which carries an access signal indicating which component of those which presently can be sources of communications may have access to the system bus and a lock line which carries a lock signal indicating that one source component is retaining access to the system bus;

the control means is further responsive to the access signal and the lock signal when the access signal indicates that the non-memory component may be the source component presently making a communication and the lock line does not indicate that another non-memory component is retaining access by providing the interprocessor communication code on the first plurality of lines and the contents of the communication providing means to the second plurality of lines; and the communication providing means is further coupled to the lock line and provides the lock signal when the source component presently making a communication is retaining access to the system bus.

17. The system bus interface apparatus as set forth in claim 12 and wherein:

the system bus further includes a fourth plurality of lines for carrying signals specifying the status of any memory communication;

the control means further provides a memory operation code of the plurality of memory operation codes on the first plurality of lines when the non-memory component is a source of a memory communication; and the communication providing means provides an address in the memory component on the second plurality of lines when the non-memory component is a source of a memory communication; and the control means is further coupled to the fourth plurality of lines and is responsive to the signals thereon.

18. The system bus interface apparatus as set forth in claim 17 and wherein:

the fourth plurality of lines includes a wait line for carrying a wait signal indicating that the non-memory source component is to wait for completion of the memory operation, a memory component busy line for carrying a memory component busy signal indicating that the memory component is busy, and a valid memory access line for carrying a valid memory access signal indicating that the memory access performed in the memory operation was valid.

19. The system bus interface apparatus as set forth in claim 17 wherein:

the system bus further includes a system bus priority line which carries an access signal indicating which component of those which presently can be sources of communications may have access to the system bus and a lock line which carries a lock signal indicating that one source component is retaining access to the system bus;

the control means is further responsive to the access signal and the lock signal when the access signal indicates that the non-memory component may be the source component presently making a communication and the lock line does not indicate that another non-memory component is retaining access by providing the interprocessor communication code on the first plurality of lines and the contents of the communication providing means to the second plurality of lines; and the communication providing means is further coupled to the lock line and provides the lock signal when the source component presently making a communication is retaining access to the system bus.

20. The system bus interface apparatus as set forth in claim 17 wherein:

the system bus includes a fifth plurality for carrying data;

the system bus interface apparatus further includes data providing and receiving means coupled to the fifth plurality of lines for receiving data from the fifth plurality of lines and providing data to the fifth plurality of lines;

the plurality of memory operation codes includes read codes specifying memory read operations and write codes specifying memory write operations;

the plurality of non-memory communication type codes includes type codes specifying communications wherein the source component provides data to the recipient component but not type codes specifying communications wherein the recipient component provides data to the source component; and the data providing and receiving means provides data to the fifth plurality of lines when the control means provides a memory operation code specifying a write operation and when the control means provides the inter processor communication code and the communication providing means provides a type code specifying a communication which provides data to the recipient component and receives data from the fifth plurality of lines when the control means provides a memory operation code specifying as read operation.

21. System bus interface apparatus as set forth in claim 20 wherein:

the memory component stores data in memory words divisible into half words and bytes;

the types of write communications include
a write byte communication for writing a byte,
a write half word communication for writing a half word,
a write word communication for writing a word, and
a write double word communication for writing two words;

the types of read communications include
a read word communication for reading a word,
a read double word communication for reading two words,
a read quad word communication for reading four words, and
a read octal word communication for reading eight words;

and the address on the second plurality lines specifies the word, the portion of a word, or the sequence of words being read or written.

22. System bus interface apparatus as set forth in claim 21 wherein:

the other components include
a central processing unit for processing data,
a system bus interface unit, and
a plurality of satellite processing units coupled to the system bus; and the types of non-memory communications include
types wherein the recipient components is the central processing unit,
types wherein the recipient component is the system bus interface unit, and
types wherein the recipient component is one of the satellite processing units.

23. System bus interface apparatus as set forth in claim 22 wherein:

the types wherein the recipient component is one of the satellite processing units include
a message transfer communication;
a data transfer communication; and
a reset recipient satellite processing unit communication.

24. System bus interface apparatus for coupling a memory component of a data processing system which includes both memory and other components to a system bus which has a first plurality of lines for carrying first codes including a plurality of memory operation codes specifying a plurality of types of memory communication having an other component as a source and the memory component as the recipient and a single inter-processor communication code specifying a non-memory communication having one of the other components as a source and another thereof as a recipient, a second plurality of lines which, when the first plurality of lines specifies a memory communication, carry an address in the memory component and, when the first plurality of lines specifies a non-memory communication, carry one of a plurality of type codes specifying a plurality of types of non-memory communications and one of a plurality of recipient address codes specifying an other component as recipient, a third plurality of lines for carrying signals specifying the status of any memory communication, a fourth plurality of lines for carrying signals specifying the status of any non-memory communication, and a fifth plurality of lines for carrying signals indicating data, the system bus interface apparatus comprising:

control means coupled to the first plurality of lines and the third plurality of lines for responding to a memory operation code by producing a first signal indicating receipt of the communication and status signals on the third lines specifying the status of the communication, the third lines including a wait line for carrying a wait signal indicating that the non-memory component which was the source of the memory operation code is to wait for completion of the specified memory operation, a busy line for carrying a busy signal indicating that the memory component is busy and that the source non-memory component is to retry specified memory operation, and a valid memory access line for carrying a valid memory access signal indicating that the speicified memory operation had valid results;

address receiving means coupled to the second plurality of lines and responsive to the first signal for retaining the address in response to the first signal; and data providing and receiving means coupled to the fifth plurality of lines for receiving data to be stored at the location specified by the retained address when the memory operation code indicates a write operation and for providing data from the location specified by the retained address when the memory operation code indicates a read operation.

* * * * *